(12) United States Patent
Setlur

(10) Patent No.: US 8,395,654 B2
(45) Date of Patent: Mar. 12, 2013

(54) OFFLOAD OF SERVER-BASED VIDEOCONFERENCE TO CLIENT-BASED VIDEO CONFERENCE

(75) Inventor: Anand R. Setlur, Naperville, IL (US)

(73) Assignee: Alcatel Lucent, Paris (FR)

( * ) Notice: Subject to any disclaimer, the term of this patent is extended or adjusted under 35 U.S.C. 154(b) by 250 days.

(21) Appl. No.: 12/930,301

(22) Filed: Jan. 3, 2011

(65) Prior Publication Data

US 2012/0169836 A1    Jul. 5, 2012

(51) Int. Cl.
*H04N 7/14*    (2006.01)
(52) U.S. Cl. ............... 348/14.09; 348/14.08; 348/14.12
(58) Field of Classification Search .... 348/14.01–14.16; 370/260, 261; 709/204–205
See application file for complete search history.

(56) References Cited

U.S. PATENT DOCUMENTS

| 7,274,675 | B2 * | 9/2007 | Iveland et al. ............... 370/260 |
| 2006/0062368 | A1 | 3/2006 | Saha et al. |
| 2012/0147127 | A1 * | 6/2012 | Satterlee et al. ........... 348/14.08 |

FOREIGN PATENT DOCUMENTS

| WO | 03007586 | 1/2003 |
| WO | 2010117607 | 10/2010 |

* cited by examiner

*Primary Examiner* — Melur Ramakrishnaiah
(74) *Attorney, Agent, or Firm* — Carmen Patti Law Group, LLC

(57) ABSTRACT

An apparatus in one example, the apparatus comprising a server configured to host a videoconference call comprising a plurality of voice and video streams, the server being communicatively associable with a plurality of clients in the videoconference call. The server being configured to determine a computing capacity of each of the plurality of clients and to hand over hosting the videoconference call to a selected one of the plurality of clients based on a computing capacity, wherein hosting the videoconference call comprises mixing the plurality of the voice and video streams into a consolidated stream, where the consolidated stream is communicated to all of the clients other than the selected client.

20 Claims, 3 Drawing Sheets

OFFLOAD OF SERVER-BASED VIDEOCONFERENCE TO CLIENT-BASED VIDEO CONFERENCE

TECHNICAL FIELD

The invention relates generally to videoconferencing and more particularly to offloading a videoconference call from a videoconference server to a client configured to host the videoconference call.

BACKGROUND

Teleconferencing has long been a way for multiple people to communicate with each other using telephony resources. As computing power has increased, videoconferencing has become a more popular manner for multiple people to meet in a way in which they can hear and see each other.

Typically teleconferencing and videoconferencing is either performed using client-based or server-based hosting. An example of client-based hosting would be when a subscriber conferences a third party into an existing phone call. Client-based hosted calls are usually voice only calls. An example of server-based hosting would be when a group of call participants agree to call in to a conference port at a predetermined time. The host or server of the conference call usually receives voice and video output of the various clients in the call, the host then mixes the voice and video into one consolidated output stream that is sent to the clients participating in the call. The clients receive this output stream, which allows each client to hear and see all other participants in the conference call. Each client may be able to see the other clients by tiling the video received in the consolidated output in way that the video sent by each client appears in an individual sub-window or tiled window. Because the videoconference server receives the video and voice output from all the clients and mixes this output, the videoconference server must have a large processing capacity.

With each passing year, the computing power and bandwidth available to clients increases. Rather than increasing processing capacity in a centralized video conferencing server, which is very expensive, it is more cost effective to decentralize the processor intensive functionality so as to leverage the vast amounts of unused processing capacity available at the edge in desktop PCs. If a videoconference server cannot add more people to a call, the service provider that charges for these services may lose revenue. Also, the participants may be disappointed in the limited number of people that can be added to a conference call. Decreasing the server load may lead to increased revenues to service providers and allow for more clients to participate in conference calls.

SUMMARY

The invention in one implementation encompasses an apparatus. The apparatus comprises a server configured to host a videoconference call comprising a plurality of voice and video streams, the server being communicatively associable with a plurality of clients in the video conference call. The server being configured to determine a computing capacity of each of the plurality of clients and to hand over hosting the videoconference call to a selected one of the plurality of clients based on a computing capacity, wherein hosting the videoconference call comprises mixing a plurality of the voice and video streams into a consolidated stream, where the consolidated stream is communicated to all of the clients of other than the selected client.

Another implementation of the invention encompasses a computing device. The computing device is configured to establish a videoconference call as a client, where the computing device communicates information comprising its computing capacity. The computing device receives a communication designating the computing device as a host of the videoconference call. The computing device hosts the videoconference call wherein hosting the videoconference call comprises receiving a plurality of at least one of voice and video streams from a plurality of clients and combining the plurality of voice and video stream into a consolidated stream and communicating the consolidated stream to the plurality of clients.

A further implementation of the invention encompasses a method. The method comprising the steps of receiving, at a server, computing capacity information from a plurality of clients, selecting a client from the plurality of clients to host a conference call, transferring to the selected client, hosting responsibility for the conference call. Where hosting the conference call comprises receiving a plurality of input streams further at least one of audio and video, and combining the plurality of input streams into a consolidated stream that is communicated to all the clients other than the selected client.

DESCRIPTION OF THE DRAWINGS

Features of example implementations of the invention will become apparent from the description, the claims, and the accompanying drawings in which:

DETAILED DESCRIPTION

Figure 1A:
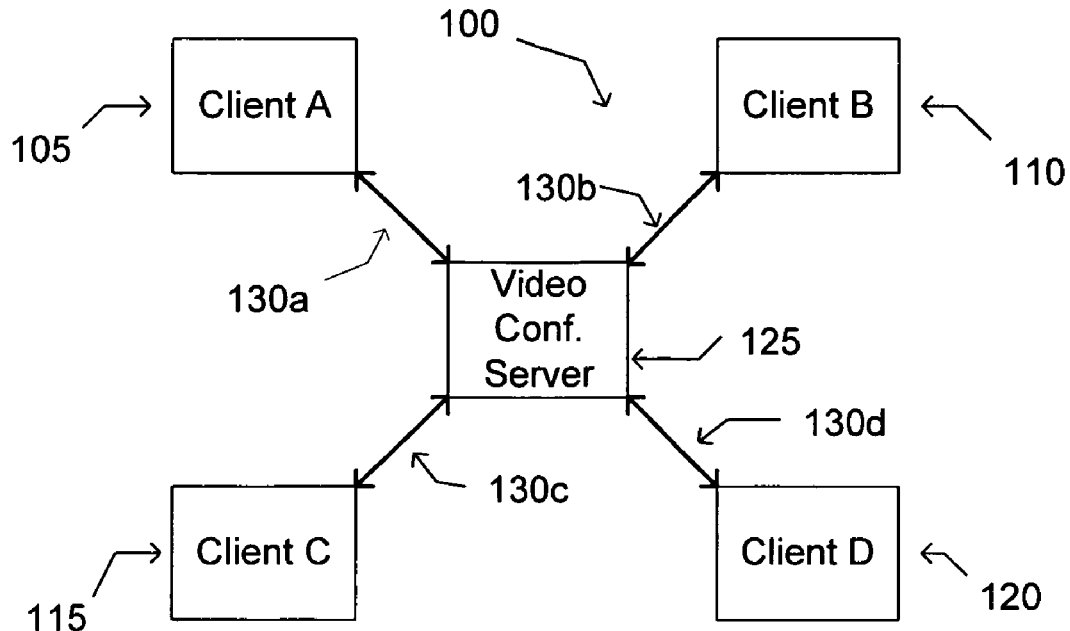
FIG. 1a is a representation of one implementation of an apparatus comprising a plurality of clients engaged in a server-based videoconference call.

Turning to FIG. 1a, an apparatus 100 in one example depicts a plurality of clients involved in a server-based videoconference call. In the example depicted there are three clients: client A 105, client B 110, client C 115 and client D 120. A client involved in a videoconference call may be a mobile client, such as a mobile phone, or a home or business computing system, such as a personal computer. For reference, we will assume that client D 120 is a personal computer. The system 100 may further comprise a videoconference server 125, which may be used to receive a data stream of video and voice from the clients 105, 110, 115, 120. The server 125 may use a conference bridge to combine the streams into one consolidated output stream that is then fed to all the clients 105, 110, 115, 120. The consolidated output stream may comprise video and voice received from participants in the conference call. Thus, the consolidated output may comprise a tiled view of each participant in the conference call. A recipient (client) may display the tiled output for viewing. For example, client A 105 may form a tile of windows on its monitor comprising video streams of the video output of client B 110, client C 115 and client D 120. Simultaneously client A 105 may play the sound of each of the other client 110, 115, 120 that is received on the consolidated output stream. Thus a participant in the conference call that is using client A 105 as a device to connect to the conference call may see the video and voice outputted by each of the other clients 110, 115, 120 in a window displayed on client A 105. This would also be true of the other clients 110, 115, 120 too. For example, client B 110 would receive the video and audio outputs of the other clients 105, 115, 120 and similarly present this output to the user operating client B 110. This pattern would be repeated at client C 115 and client D 120.

In an embodiment, a recipient of the consolidated output may instruct the videoconference server as to which other participants the recipient wants to view. Thus the recipient may inform the videoconference server that it (the recipient) only wants to receive video output from a particular call participant, accordingly the consolidated output that is communicated to the recipient will only comprise the video output of that particular call participant.

As seen in FIG. 1a each of the clients 105, 110, 115, 120 may be communicatively associable with the videoconference server 125 via a link 130a-d. Because the clients may be different types of devices, such as, for example, a mobile phone or desktop computer, the underlying or transport technology used to form the link may differ. At a higher level, however, each link 130a may be comprised of a protocol that supports session initiation protocol (SIP) or any protocol that supports voice over Internet Protocol (IP). Thus all the clients 105, 110, 115, 120 and the server 125 may be communicating over IP. The server 125 may reside within a service provider's network. The clients 105, 110, 115, 120 may be connected to the server 125 via IP through other networks, such as, for example a home network, a business network, a service providers network or a wireless network.

Although FIG. 1a shows all the clients 105, 110, 115, 120 connected and interacting via the server 125, when the conference call was originally established, each client 105, 110, 115, 120 may have independently established a connection with the server 125 at a different time. Thus, client A 105 may have called into the conference bridge of the server 125 first. After awhile client B 110 may have called in, and so forth, until all the clients have joined. In the embodiment depicted, SIP signaling is used to establish these calls. Typically when a call is established using SIP, a SIP invite and SIP status message is exchanged between the parties establishing the call. Thus server 125 and client A 105 may exchange a SIP invite and SIP status message when client A 125 establishes a call with the conference bridge of the videoconference server 125. As part of this SIP message exchange, the client 105 and server 125 may add optional parameters to the SIP messages. These optional parameters may contain additional information that a sender may want to convey to a recipient. For example, the client 105 may send optional parameters to the server 125 which conveys information concerning the client's 105 computing capacity. In an embodiment, the information concerning computing capacity sent from the client 105 to the server 125, may comprise available bandwidth, CPU usage and other parameters that may provide information concerning the client's 105 ability to mix a videoconference call, and communicate a consolidated output to other clients participating in the conference call other than itself 105.

This exchange of SIP messages and optional parameters may continue for each client 105, 110, 115, 120 that joins the conference call. Thus when client B 110 joins the conference call, client B 110 may also communicate its 110 computing capacity to the server 125 using SIP optional parameters. Each time one of the clients 105, 110, 115, 120 communicates computing capacity information to the server 125, the server 125 may store that information and correlate the computing capacity data with the client 105, 110, 115, 120 that sent the data. Once the call has reached the point where all the clients 105, 110, 115, 120 have logged in to the conference call, the server 125 may have information concerning the computing capacity of each client 105, 110, 115, 120 participating in the conference call.

After the call is established, the server 125 and the clients 105, 110, 115, 120 may continue to exchange information concerning the client's 105, 110, 115, 120 computing capacity using SIP info messages. In other words, once the call is established, the server 125 may continue to intermittently receive information concerning the computing capacity of each client 105, 110, 115, 120. To receive this information, the server 125 may send a SIP info message to each client 105, 110, 115, 120 to prompt the client 105, 110, 115, 120 to send computing capacity information. Alternatively, each client 105, 110, 115, 120 may intermittently autonomously send its 105, 110, 115, 120 computing information to the server 125. As before, the server 125 may collect and correlate this information with each client 105, 110, 115, 120 that sent the data.

The server 125 may compare the received computing capacity data with a threshold that indicates whether a client 105, 110, 115, 120 is capable of hosting a videoconference call. Hereinafter hosting a videoconference call may refer to performing the responsibilities of a videoconference server for a videoconference call. As previously explained, hosting a videoconference call requires a tremendous amount of computing power to do the mixing of voice and video. Further, a hosting server would have to have a sufficient amount of bandwidth to communicate the consolidated output stream to every client participating on a conference call. If the server 125 determines that a client has a sufficient amount of computing and bandwidth capacity, the server 125 may instruct the client with sufficient computing capacity to assume the responsibility of mixing the conference call video and voice, and outputting the consolidated output to the other clients participating in the conference call other the client with sufficient computing capacity.

As an example, if the server 125 determines that client D 120 has the computing capacity to perform the functions of a videoconference server, the server 125 may send a SIP Info message to client D 120 with optional parameters informing it 120 to prepare to become a videoconference server for the ongoing conference call. In an embodiment the SIP info message may contain an optional parameter indicating the clients 105, 110, 115 participating in the call. Once the client D 120 assumes the role of the conference call host, client D 120 may be referred to as a client-server. Hereinafter, a client-server may be a conference call participant that may act as a client, but it is currently acting as the host, i.e. the videoconference server of the conference call. After the server 125 has informed the new client-server 120 of the changeover, the server 125 may send SIP re-invite messages to the clients 105, 110, 115 remaining in the conference call. The SIP re-invite message may comprise, for example, the IP address of the new client-server 120. Upon receipt of the re-invite message each client 105, 110, 115 may establish a videoconference call with the client-server 120, and the client-server 120 may now mix the video/voice output received from the clients 105, 110, 115 and communicate the consolidated output to the clients 105, 110, 115.

At this point the conference call is established with the client-server 120 performing the mixing, as depicted in FIG.

1b. Although, client-server 120 is acting as a videoconference server, videoconference server 125 retains information concerning which client 105, 110, 115, 120 is acting as the client-server 120. Thus the videoconference server 125 maintains a logical link to the client-server 120. This logical link is depicted as a dashed line 140 between the server 125 and the client-server 120. Because the server 125 was originally known to be the host of the conference call, any clients attempting to join the call may try to join the call via server 125. If, after the client-server 120 is acting as the videoconference server, another client wants to join the conference call, the late arriving client may send a request to join to the videoconference server 125. The server 125, however, is no longer hosting the call. Because the server 125 has maintained information that indicates that client D 120 is now hosting the call, the server 125 may send a SIP re-invite to the late arriving client, to direct the late arriving client to the client-server 120 now hosting the call. The re-invite that redirects the late arriving client may comprise information such as the IP address of the new hosting server 125. Upon receipt of the SIP re-invite message, the late arriving client may establish a connection with the client-server 120 and establish a video connection with client-server 120.

Figure 2:
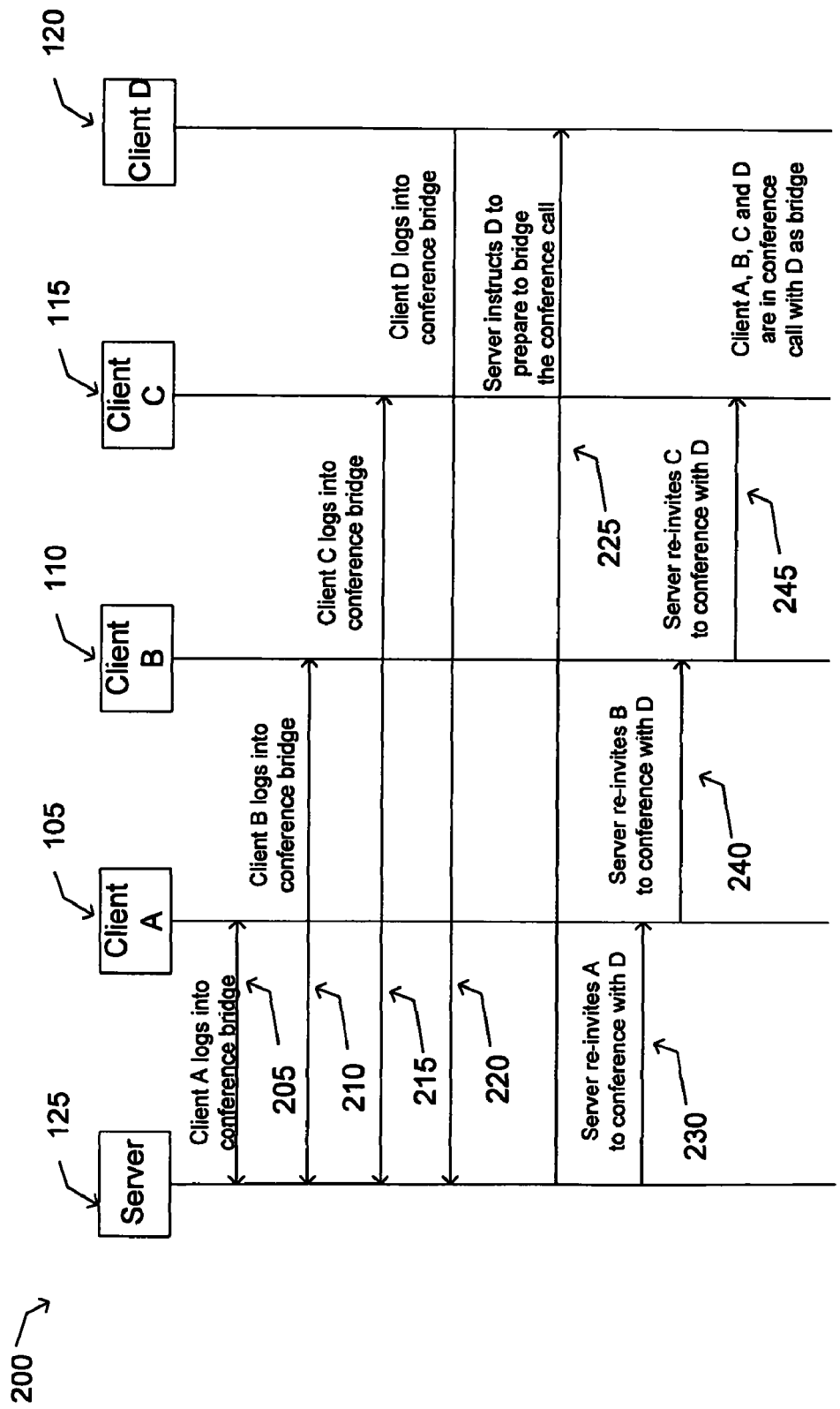
FIG. 2 is a representation of a call flow depicting messaging involved in transferring a videoconference call from a server to a client-server.

Turning now to FIG. 2, which depicts a call flow 200 that may be associated with transferring a videoconference call to a client currently participating in the videoconference call. In an embodiment, the messages associated with the call flow 200 may be SIP messages, but the call flow 200 may be implemented using any messaging protocol that may support a establishing and maintaining a videoconference call. Initially there are no clients logged into the conference bridges. The message sequences 205, 210, 215, 220 depict the clients 105, 110, 115, 120 establishing a connection with the server 125. The message sequence 205 represents messaging that may occur between the videoconference server 125 and client A 105. Although the message sequence 205 is depicted with a single line, the sequence may involve multiple messages being exchanged between server 125 and client 105, such as a SIP info and SIP status messages. The other clients 110, 115, 120 may establish a video call with the server 125 in a similar fashion. This is depicted in flows 210, 215, 220. As each client 105, 110, 115, 120 establishes a connection with the server 125, the server 125 may collect computing capacity information of each client 105, 110, 115, 120 and determine if any of the clients 105, 110, 115, 120 have a computing capacity greater than an amount necessary to host a videoconference call.

If only one client has computing capacity sufficient to host the conference call, the server 125 may inform that client that it will perform the operations of a client-server and thus should prepare to host other clients in a conference call. If more than one client 105, 110, 115 has a computing capacity greater than an amount necessary to host a conference call, the server 125 may determine which one of the two qualifying clients may host the conference call. In one embodiment the qualifying client may be the client with the greatest computing capacity. The way the server 125 determines which client has the greatest computing capacity may vary depending on the embodiment. In one embodiment, the client with the greatest computing capacity may be the client with the greatest available bandwidth. In another embodiment, the client with the greatest computing capacity may be the client with the greatest available CPU usage. In other embodiments, the client with the greatest computing capacity may determined based on varying assigned weights to computing capacity, bandwidths and other variables that may be considered relevant to a client's ability to host a conference call.

In still another embodiment, a client may be an anchor client. An anchor client may be a client that is assigned to host a conference call regardless of the computing capacity of the other clients that may join the conference call. For example, when reserving resources for the conference call, a user may inform the server 125 of the IP address of a client that may be an anchor client. In this example, the anchor client may be client D 120. When client D 120 logs into the videoconference server 125, the server 125 may send a SIP info to client D 120 to inform the client 120 that it will host the conference call. The server 125 may send a SIP re-invite message to any clients that are currently in the call to inform those clients that client D 120 will be the new conference host. Also, the server 125 may redirect to the new host client D 120, any clients that may try to join conference call by trying to log into server 125.

Once the server 125 determines which client will host the conference call, the server 125 may send a SIP info message to the client instructing the client that it will host a videoconference call. In the example depicted, client D 120 is picked to host the videoconference call, thus the videoconference server 125 sends a message 225, such as a SIP info message to instruct client D 120 that it will host a videoconference call. The server 125 may also send SIP re-invite messages 230, 240, 245 to clients 105, 110, 115 informing them 105, 110, 115 that client D 120 is now the host of the conference call. The SIP re-invite message may comprise an IP address or other addressing information of client D 120 so that the clients 105, 110, 115 know to redirect their 105, 110, 115 video call output to client D 120 so that client D 120 can perform mixing and output a consolidated output stream.

At this point clients 105, 110, 115 and 120 are involved in a conference call with client D 120 acting as the videoconference call bridge. Server 125 is no longer mixing the video/voice associated with the videoconference call. Thus clients 105, 110, 115 send their video call output to client D 120, client D 120 mixes the video and voice into a consolidated output stream, and sends the consolidated output stream to the other clients 105, 110 and 115. Further, client D 120 may provide a tiled video output and combined voice to a user logged onto client D 120, where the tiled video output and combined voice are formed from the consolidated output stream. Also, as explained above, the previous server 125 may store information noting that client D 125 is now the host of the videoconference call. If another client should try to the join videoconference call by attempting to establish a connection with the server 125, the server 125 may redirect the late joining client to the client-server 120. The server 125 may send a SIP re-invite message comprising the IP address of client-server 120 to the late joining client, to inform the late joining client that client-server 120 is now the hosting server for the conference call.

Once client D 120 is established as the host server for the conference call, if a user that is logged into the videoconference call leaves the call, the client 120 may remain as host of the conference call regardless of whether the user is still logged into the conference call.

Figure 3:
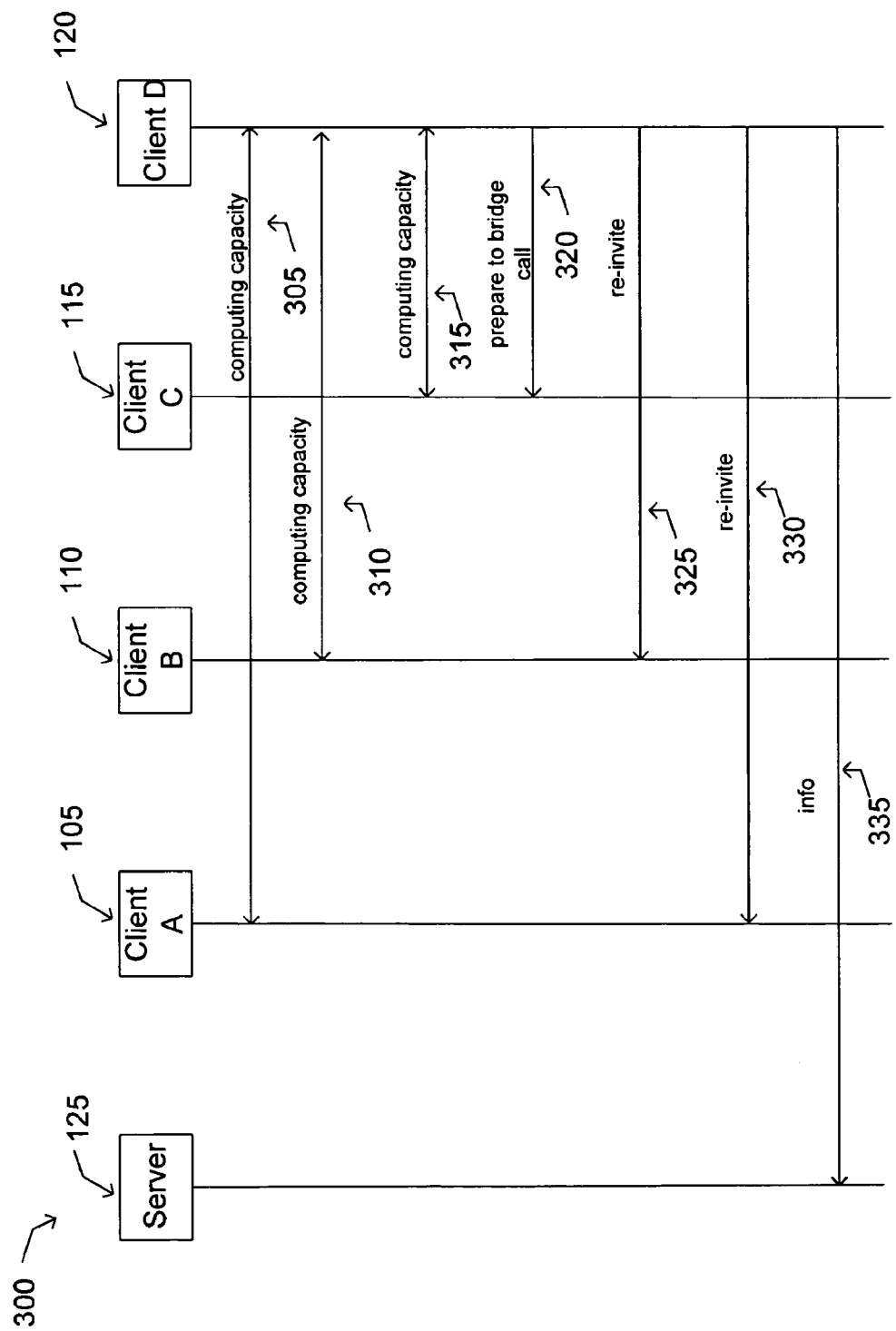
FIG. 3 is a representation of a call flow depicting a client-server transferring a videoconference call to another client-server.

Turning now to FIG. 3, which depicts a call flow that shows the hosting of a videoconference call going from a first client-server to a second client-server. The call flow begins from the point where client D 120 is hosting a videoconference call and thus is acting as a client-server. The other participants in the call may be client A 105, client B 110 and client C 115. Even after client D 120 is hosting the conference call, the other clients 105, 110, 115 may continue to intermittently send client-server 120 status updates with computing capacity information. The clients 105, 110, 115 may send the computing capacity information autonomously, or the clients 105, 110, 115 may respond to a prompt from the client-server 120 for information concerning their 105, 110, 115 computing capacity. This exchange of computing capacity information is shown by messages 305, 310, 315. In an embodiment, the messages 305, 310, 315 may be SIP info messages which contain computing capacity information such as available bandwidth and CPU usage of a particular client. Thus, for example, client 105 may, autonomously or in response to a query from the server, send message 305 to the client-server 120. The message 305 may comprise computing capacity information of client 105. Clients 110, 115 may similarly communicate their 110, 115 computing information to the client-server 120.

As the client-server 120 collects computing capacity information of the other clients 105, 110, 115, the client-server 120 may determine if any of the other clients 105, 110, 115 has a computing capacity greater than its 120 computing capacity, and thus may be able to host the videoconference call. When determining whether a client has enough capacity to host the conference call, the client-server 120 may have a relative threshold above which the prospective client-server must be in order to host the videoconference call. For example, the client-server 120 may want to ensure that a prospective client-server has 50% more computing capacity relative to the computing capacity of the client-server 120 before the client-server 120 transfers the hosting duties to the prospective client server. As explained above, computing capacity may be characterized by bandwidth, CPU usage as well as other characteristics of a videoconference client. A server may weigh these attributes in different ways to determine which prospective server has a greater computing capacity.

In the example depicted, client C 115 may have a relatively greater computing capacity than client D 120. Thus client D 120 may transfer the videoconference hosting duties to client C 115 in much the same way as described in relation to FIG. 2. Accordingly, client D 120 may send a SIP info message 320 instructing client C 115 to prepare to host the conference call. Client D 120 may also send SIP re-invite messages 325, 330 to clients 110 and 105 respectively, which directs the clients 110, 105 to send their video call output to client 115. The client-server D 120 may also send a SIP info message 335 to the server 125, instructing the server 125 that client C 115 is now the host of the videoconference call. At this point, client C 115 is now the client-server of the videoconference call. Client D 120 is no longer a client-server, but is merely a client to the videoconference call. Because the server 125 knows that client-server 115 is now hosting the conference call, the server 125 may re-invite any late arriving clients to client-server C 115 so that client-server C 115 may perform video and voice mixing for the conference call.

While the call continues, the clients 105, 110, 120 of the conference call may continue to send computing capacity information via SIP info messages to the client-server 115. If the computing capacity of one of the clients 105, 110, 120 is relatively greater than the client-server's 115 computing capacity, the client-server 115 may transfer conference call hosting duties to the client with the relatively greater computing capacity.

In still another embodiment, a client-server may become overloaded and determine that it no longer has the computing capacity to host a videoconference call, and there may not be any other clients capable of hosting the videoconference call. In this case the overloaded client-server may transfer the hosting duties back to the server 125. For example, if client 120 is acting as a client-server hosting the videoconference call, and client-server 120 determines that it has become overloaded and thus can no longer host the videoconference call, client-server 120 may send a SIP info message to the server 125. The SIP info message may contain optional parameters that indicate that the client-server 120 wants to transfer hosting responsibilities to the server 125. The SIP info may also contain information indicating who the participants in the videoconference call are. If the server 125 has the capacity to host the conference call, the server 125 may send a SIP re-invite message to the participants in the conference call indicating that the server 125 is now hosting the conference call and thus the participants should send video output to the server 125 for mixing. If the server 125 cannot host the conference call, the server 125 may send SIP re-invite messages to direct the conference call participants to another server that may host the conference call.

Figure 1B:
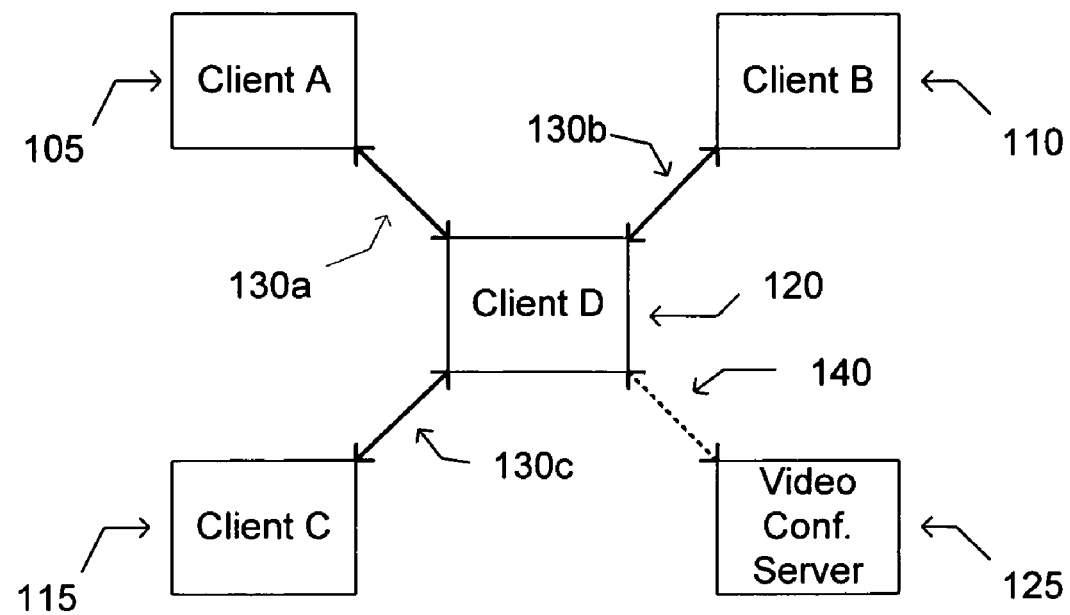
FIG. 1b is a representation of one implementation of an apparatus comprising a plurality of clients engaged in a videoconference call with one of the clients acting as a client-server.

For example, in the scenario described in FIG. 1b, transferring a call from the client-server 120 to the server 125 may entail the client-server 120 determining that it can no longer host the conference call. The client-server 120 may send a SIP info message containing optional parameters to server 125 informing the server 125 that it 120 can no longer host the videoconference call. The SIP info may also comprise optional parameters indicating the participants in the videoconference call. The server 125 may respond by sending a SIP re-invite message to the clients 105, 110, 115, 120 directing the clients 105, 110, 115, 120 to a new hosting server. The new hosting server may be the server 125, or another server that the server 125 may redirect the call to.

The clients, client-servers and server depicted in FIG. 1a, 1b and the call flow shown in FIGS. 2 and 3, in one example comprises a plurality of components such as one or more of electronic components, hardware components, and computer software components. A number of such components can be combined or divided in the clients, client-servers and servers. An example component of the clients, client-servers and servers employs and/or comprises a set and/or series of computer instructions written in or implemented with any of a number of programming languages, as will be appreciated by those skilled in the art. The clients, client-servers and servers in one example comprises any (e.g., horizontal, oblique, or vertical) orientation, with the description and figures herein illustrating one example orientation of the clients, client-servers and servers, for explanatory purposes.

The clients, client-servers and servers in one example employs one or more computer-readable signal-bearing media. The computer-readable signal-bearing media store software, firmware and/or assembly language for performing one or more portions of one or more implementations of the invention. Examples of a computer-readable signal-bearing medium for clients, client-servers and servers comprise recordable data storage medium. The computer-readable signal-bearing medium for the clients, client-servers and servers in one example comprise one or more of a magnetic, electrical, optical, biological, and atomic data storage medium. For example, the computer-readable signal-bearing medium comprise floppy disks, magnetic tapes, CD-ROMs, DVD-ROMs, hard disk drives, and electronic memory.

The steps or operations described herein are just for example. There may be many variations to these steps or operations without departing from the spirit of the invention. For instance, the steps may be performed in a differing order, or steps may be added, deleted, or modified.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

I claim:

1. An apparatus, comprising:
a server configured to host a videoconference call comprising a plurality of voice and video streams, the server being communicatively associable with a plurality of clients in the video conference call; and
the server being configured to determine a computing capacity of each of the plurality of clients and to hand over hosting the videoconference call to a selected one of the plurality of clients based on computing capacity associated with the plurality of clients, wherein hosting the videoconference call comprises mixing the plurality of the voice and video streams into a consolidated stream, where the consolidated stream is communicated to all of the clients other than the selected client.

2. The apparatus of claim 1 wherein determining the computing capacity of each of the plurality of clients further comprises receiving from each of the clients, communications concerning the computing capacity of each of the clients; and
wherein the selected client has a greater computing capacity than all of the clients other than the selected client.

3. The apparatus of claim 1 wherein the selected client comprises an anchor client.

4. The apparatus of claim 3, wherein if a participant of the videoconference call that is logged onto the anchor client logs off the anchor client while the anchor client is hosting the videoconference call, the anchor client continues hosting the videoconference call after the participant has logged off.

5. The apparatus of claim 1, wherein the client hosting the videoconference call is a personal computer and the other clients are wireless communication devices.

6. The apparatus of claim 1, wherein the server no longer receives voice and video of the videoconference call after the server hands over hosting the videoconference call to the selected client.

7. The apparatus of claim 1, wherein the server communicates an address of a new device which acts as the videoconference call host to all of the clients other than the selected client.

8. A computing device that is configured to establish a videoconference call as a client, where the computing device communicates information comprising its computing capacity;
the computing device receives a communication designating the computing device as a host of the videoconference call; and
the computing device hosts the videoconference call wherein hosting the videoconference call comprises receiving a plurality of at least one of voice and video streams from a plurality of clients and combining the plurality of voice and video streams into a consolidated stream and communicating the consolidated stream to the plurality of clients.

9. The computing device of claim 8, wherein the computing device is a personal computer.

10. The computing device of claim 8, wherein after the computing device becomes host of the videoconference call, the computing device determines a computing capacity of each the plurality of clients in the videoconference call, and if an other computing device has a greater computing capacity than the computing device that is hosting the videoconference call, the computing device hosting the videoconference call hands over the videoconference call to the other computing device so that the other computing device now hosts the videoconference call.

11. The computing device of claim 10, wherein the computing device communicates to the plurality of clients in the videoconference call, an address which designates the other computing device as host of the conference call.

12. The computing device of claim 8, wherein if a user logs off the computing device during the videoconference call, the computing device continues to host the videoconference call.

13. The computing device of claim 8, wherein the computing device is an anchor client and hosts the videoconference call even if other clients in the videoconference call have greater computing capacity.

14. The computing device of claim 8, wherein after the client begins hosting the videoconference call, the client accepts requests from other devices to join the videoconference call.

15. A method comprising the steps of:
receiving, at a server, computing capacity information from a plurality of clients;
selecting a client from the plurality of clients to host a conference call;
transferring to the selected client, hosting responsibility for the conference call;
wherein hosting the conference call comprises receiving a plurality of input streams comprising at least one of audio and video, and combining the plurality of input streams into a consolidated stream that is communicated to all the clients other than the selected client.

16. The method of claim 15, wherein selecting the client, further comprises selecting the client with a greatest computing capacity.

17. The method of claim 15, wherein the selected client receives communications from the plurality of clients comprising the conference call, and if an other client has a greater computing capacity than the selected client, the selected client transfers hosting of the conference call to the other client.

18. The method of claim 15, wherein the server transfers the conference call to an anchor client regardless of the computing capacity of the plurality of clients in the conference call.

19. The method of claim 15, wherein the server communicates an address of the selected client to all of the clients other than the selected client, and the plurality of clients on the conference call communicate input streams to the selected client.

20. The method of claim 15, wherein the selected client is a personal computer and all of the other clients other than the selected client are mobile communication devices.

* * * * *